(12) United States Patent
Campbell et al.

(10) Patent No.: US 8,051,087 B2
(45) Date of Patent: Nov. 1, 2011

(54) CUSTOMIZED GEOGRAPHICAL LOCATION INDEXING

(75) Inventors: Bruce Andrew Campbell, Hertfordshire (GB); Eddie Babcodk, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 479 days.

(21) Appl. No.: 12/242,148

(22) Filed: Sep. 30, 2008

(65) Prior Publication Data

US 2009/0100007 A1 Apr. 16, 2009

Related U.S. Application Data

(63) Continuation-in-part of application No. 10/982,629, filed on Nov. 4, 2004, now abandoned.

(30) Foreign Application Priority Data

Jul. 4, 2004 (GB) .................................. 0415072.8

(51) Int. Cl.
G06F 7/00 (2006.01)
G06F 17/30 (2006.01)
G06F 15/16 (2006.01)

(52) U.S. Cl. ........................................ 707/743; 707/798

(58) Field of Classification Search .................. 707/743, 707/798
See application file for complete search history.

(56) References Cited

U.S. PATENT DOCUMENTS

| | | | |
|---|---|---|---|
| 5,054,008 A | 10/1991 | Darling | |
| 5,978,747 A | 11/1999 | Craport et al. | |
| 6,111,582 A * | 8/2000 | Jenkins | 345/421 |
| 6,247,019 B1 * | 6/2001 | Davies | 707/103 |
| 6,262,741 B1 | 7/2001 | Davies | |
| 6,295,502 B1 | 9/2001 | Hancock et al. | |
| 6,317,718 B1 | 11/2001 | Fano | |
| 6,377,961 B1 | 4/2002 | Ryu | |
| 6,553,310 B1 | 4/2003 | Lopke | |
| 6,625,595 B1 | 9/2003 | Anderson et al. | |
| 6,684,219 B1 * | 1/2004 | Shaw et al. | 707/3 |
| 6,708,112 B1 | 3/2004 | Beesley et al. | |
| 6,732,120 B1 * | 5/2004 | Du | 707/743 |
| 6,757,686 B1 * | 6/2004 | Syeda-Mahmood et al. | 707/3 |

(Continued)

FOREIGN PATENT DOCUMENTS

EP 1 217 549 A2 6/2002

(Continued)

OTHER PUBLICATIONS

International Search Report and Written Opinion of the International Searching Authority from corresponding PCT application No. PCT/US2009/058310, dated May 3, 2010, 7 pages.

*Primary Examiner* — Greta Robinson
*Assistant Examiner* — Brian E Weinrich
(74) *Attorney, Agent, or Firm* — Brinks Hofer Gilson & Lione

(57) ABSTRACT

A system is disclosed for customizing a geographic location index based on user preferences. The system obtains geographic data provided by a user and generates a customized geographic region based on the obtained geographic data. The system generates relationship data corresponding to the new customized geographic region. The system updates the geographic location index based on the new customized geographic region and corresponding relationship data. Thereafter, on-line content may be delivered to an audience associated with the new customized geographic region, thereby allowing the user, such as an advertiser or publisher, to define targeting regions that are optimal to their specific business environment.

12 Claims, 13 Drawing Sheets

State Layer (selection):

| Polygon Identifier | Neighbor Polygons | Parent Polygon(s) | Child Polygon(s) | Geographical Co-ordinates contained in subject polygon |
|---|---|---|---|---|
| State 1 | State 2<br>State 3<br>State 4<br>State 20 | Country A | County 1<br>County 2<br>County 3<br>County 4 | |
| State 2 | State 1<br>State 3<br>State 4 | Country A | County 10<br>County 11<br>County 12<br>County 13 | |
| State 3 | State 1<br>State 2<br>State 4<br>State 10<br>State 11<br>State 20<br>State 33 | Country A | County 20<br>County 21<br>County 22<br>County 23 | |
| State 4 | State 1<br>State 2<br>State 3<br>State 20<br>State 30<br>State 33 | Country A | County 30<br>County 31<br>County 32<br>County 33 | Co-ordinate 1 (C1)<br>Co-ordinate 2 (C2)<br>Co-ordinate 3 (C3)<br>Co-ordinate 4 (C4) |
| State 10 | State 3<br>State 11<br>State 12<br>State 20 | Country B | County 40<br>County 41<br>County 42<br>County 43 | |
| State 20 | State 1<br>State 3<br>State 4<br>State 10<br>State 12<br>State 21<br>State 22<br>State 30 | Country C | County 50<br>County 51<br>County 52<br>County 53 | Co-ordinate 10 (C10)<br>Co-ordinate 11 (C11)<br>Co-ordinate 12 (C12)<br>Co-ordinate 13 (C13) |
| State 30 | State 4<br>State 20<br>State 22<br>State 31<br>State 32<br>State 33 | Country D | County 60<br>County 61<br>County 62<br>County 63 | Co-ordinate 20 (C20)<br>Co-ordinate 21 (C21)<br>Co-ordinate 22 (C23)<br>Co-ordinate 23 (C23) |

U.S. PATENT DOCUMENTS

| | | |
|---|---|---|
| 6,879,980 B1 * | 4/2005 | Kothuri et al. ................ 707/743 |
| 6,895,126 B2 | 5/2005 | Di Bernardo et al. |
| 7,107,046 B1 | 9/2006 | Mainard et al. |
| 7,107,285 B2 * | 9/2006 | von Kaenel et al. .............. 707/3 |
| 7,136,915 B2 | 11/2006 | Riger, III |
| 7,152,071 B2 * | 12/2006 | Xing ............................ 707/743 |
| 7,383,275 B2 * | 6/2008 | Chen et al. ................... 707/743 |
| 7,689,621 B1 * | 3/2010 | Huber et al. ................. 707/743 |
| 2002/0013656 A1 | 1/2002 | Namba |
| 2002/0047895 A1 | 4/2002 | Bernardo et al. |
| 2002/0122055 A1 | 9/2002 | Parupudi et al. |
| 2002/0188581 A1 * | 12/2002 | Fortin et al. ..................... 706/20 |
| 2003/0233403 A1 * | 12/2003 | Bae et al. .................. 707/104.1 |
| 2005/0049765 A1 | 3/2005 | Chetia et al. |
| 2005/0122055 A1 | 6/2005 | Ballenger et al. |
| 2007/0100802 A1 | 5/2007 | Celik |

FOREIGN PATENT DOCUMENTS

| | | |
|---|---|---|
| KR | 10-2000-0054319 | 9/2000 |
| KR | 10-2001-0111899 | 12/2001 |

* cited by examiner

Country Layer (Top Layer):

| Polygon Identifier | Neighbor Polygons | Parent Polygon(s) | Child Polygon(s) | Geographical Co-ordinates contained in subject polygon |
|---|---|---|---|---|
| Country A | Country B<br>Country C<br>Country D | None | State 1<br>State 2<br>State 3<br>State 4 | Co-ordinate 1 (C1)<br>Co-ordinate 2 (C2)<br>Co-ordinate 3 (C3)<br>Co-ordinate 4 (C4) |
| Country B | Country A<br>Country C<br>Country D<br>Country E | None | State 10<br>State 11<br>State 12<br>State 13 | |
| Country C | Country A<br>Country B<br>Country D | None | State 20<br>State 21<br>State 22<br>State 23 | Co-ordinate 10 (C10)<br>Co-ordinate 11 (C11)<br>Co-ordinate 12 (C12)<br>Co-ordinate 13 (C13) |
| Country D | Country A<br>Country B<br>Country C<br>Country E | None | State 30<br>State 31<br>State 32<br>State 33 | Co-ordinate 20 (C20)<br>Co-ordinate 21 (C21)<br>Co-ordinate 22 (C22)<br>Co-ordinate 23 (C23) |
| Country E | Country B<br>Country D | None | State 40<br>State 41<br>State 42<br>State 43 | |

FIG. 6a

State Layer (selection):

| Polygon Identifier | Neighbor Polygons | Parent Polygon(s) | Child Polygon(s) | Geographical Co-ordinates contained in subject polygon |
|---|---|---|---|---|
| State 1 | State 2<br>State 3<br>State 4<br>State 20 | Country A | County 1<br>County 2<br>County 3<br>County 4 | |
| State 2 | State 1<br>State 3<br>State 4 | Country A | County 10<br>County 11<br>County 12<br>County 13 | |
| State 3 | State 1<br>State 2<br>State 4<br>State 10<br>State 11<br>State 20<br>State 33 | Country A | County 20<br>County 21<br>County 22<br>County 23 | |
| State 4 | State 1<br>State 2<br>State 3<br>State 20<br>State 30<br>State 33 | Country A | County 30<br>County 31<br>County 32<br>County 33 | Co-ordinate 1 (C1)<br>Co-ordinate 2 (C2)<br>Co-ordinate 3 (C3)<br>Co-ordinate 4 (C4) |
| State 10 | State 3<br>State 11<br>State 12<br>State 20 | Country B | County 40<br>County 41<br>County 42<br>County 43 | |
| State 20 | State 1<br>State 3<br>State 4<br>State 10<br>State 12<br>State 21<br>State 22<br>State 30 | Country C | County 50<br>County 51<br>County 52<br>County 53 | Co-ordinate 10 (C10)<br>Co-ordinate 11 (C11)<br>Co-ordinate 12 (C12)<br>Co-ordinate 13 (C13) |
| State 30 | State 4<br>State 20<br>State 22<br>State 31<br>State 32<br>State 33 | Country D | County 60<br>County 61<br>County 62<br>County 63 | Co-ordinate 20 (C20)<br>Co-ordinate 21 (C21)<br>Co-ordinate 22 (C23)<br>Co-ordinate 23 (C23) |

FIG. 6b

County Layer (selection):

| Polygon Identifier | Neighbor Polygons | Parent Polygon(s) | Child Polygon(s) | Geographical Co-ordinates contained in subject polygon |
|---|---|---|---|---|
| County 31 | County 30<br>County 32<br>County 50<br>County 52<br>County 60<br>County 61 | State 4 | Post Code 1<br>Post Code 2<br>Post Code 3<br>Post Code 4 | Co-ordinate 1 (C1)<br>Co-ordinate 2 (C2)<br>Co-ordinate 3 (C3)<br>Co-ordinate 4 (C4) |
| County 50 | County 31<br>County 51<br>County 52<br>County 60 | State 20 | Post Code 10<br>Post Code 11<br>Post Code 12<br>Post Code 13 | Co-ordinate 10 (C10)<br>Co-ordinate 11 (C11)<br>Co-ordinate 12 (C12)<br>Co-ordinate 13 (C13) |
| County 60 | County 31<br>County 50<br>County 51<br>County 61<br>County 62 | State 30 | Post Code 20<br>Post Code 21<br>Post Code 22<br>Post Code 23 | Co-ordinate 20 (C20)<br>Co-ordinate 21 (C21)<br>Co-ordinate 22 (C22)<br>Co-ordinate 23 (C23) |

FIG. 6c

Post Code Layer (selection) (penultimate to bottom layer):

| Polygon Identifier | Neighbor Polygons | Parent Polygon(s) | Child Polygon(s) | Geographical Co-ordinates contained in subject polygon |
|---|---|---|---|---|
| Post Code 3 | Post Code 2<br>Post Code 4<br>Post Code 10<br>Post Code 20 | County 31 | Building 1<br>Building 2<br>Building 3<br>Building 4 | Co-ordinate 1 (C1)<br>Co-ordinate 2 (C2)<br>Co-ordinate 3 (C3)<br>Co-ordinate 4 (C4) |
| Post Code 10 | Post Code 2<br>Post Code 3<br>Post Code 4<br>Post Code 11<br>Post Code 12<br>Post Code 13<br>Post Code 20<br>Post Code 21 | County 50 | Building 10<br>Building 11<br>Building 12<br>Building 13 | Co-ordinate 10 (C10)<br>Co-ordinate 11 (C11)<br>Co-ordinate 12 (C12)<br>Co-ordinate 13 (C13) |
| Post Code 20 | Post Code 3<br>Post Code 4<br>Post Code 10<br>Post Code 11<br>Post Code 21<br>Post Code 22 | County 60 | Building 20<br>Building 21<br>Building 22<br>Building 23 | Co-ordinate 20 (C20)<br>Co-ordinate 21 (C21)<br>Co-ordinate 22 (C22)<br>Co-ordinate 23 (C23) |

FIG. 6d

CUSTOMIZED GEOGRAPHICAL LOCATION INDEXING

PRIORITY CLAIM

This application is a continuation-in-part of, and claims priority to, U.S. application Ser. No. 10/982,629, filed Nov. 4, 2004, which claims priority to Great Britain Application No. 0415072.8, filed Jul. 5, 2004, which are incorporated herein by reference.

BACKGROUND

1. Technical Field

This application relates to geographical location indexing. In particular, this application relates to customizable geographical location indexing.

2. Related Art

The availability of powerful tools for developing and distributing Internet content has led to an increase in information, products, and services offered through the Internet, as well as a dramatic growth in the number and types of consumers using the Internet. To sift through this immense volume of information, a user often submits queries to search engines that provide responsive information that meets the criteria specified by the queries. In addition, advertisers and/or publishers may direct on-line content tailored to certain audiences based on characteristics of that audience, such as geographical location, in order to provide more relevant and useful information to the audience.

For example, user queries that include geographic content may enable enterprises to identify entities, such as place names, street addresses, or other entities associated with a specific physical location. Geographic or other query types may provide an important source of revenue for e-commerce enterprises, such as Internet-based search engines, advertisers, etc. E-commerce enterprises provide results to a user based on the user's submitted query terms or other relevant information. In this manner, such enterprises may provide advertising and other information or content to the user.

However, indexing geographical location data for retrieval in such applications is becoming increasingly challenging as data volumes are increasing in size, and as service providers and on-line publishers attempt to organize geographical data for faster retrieval. Different publishers and advertisers often operate in different business environments and have varying criteria for determining what products to target to which audience(s). Thus, many applications dealing with geographical data, such as for publishing results to Internet queries or geographical audience targeting by advertisers, should allow a publisher and/or advertiser to geographically tailor their advertising or search result content to an optimal target audience. A need therefore exists for a system that offers flexibility to advertisers, publishers, and other on-line content delivery entities, in defining geographical target zones that are optimal to their unique business environments.

BRIEF SUMMARY

A system is disclosed for customizing a geographic location index based on user preferences. The system obtains geographic data provided by a user and generates a customized geographic region based on the obtained geographic data. The system generates relationship data corresponding to the new customized geographic region. The system updates the geographic location index based on the new customized geographic region and corresponding relationship data. Thereafter, on-line content may be delivered to an audience associated with the new customized geographic region, thereby allowing a user, such as an advertiser or publisher, to define targeting regions that are optimal to their specific business environment.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, with an emphasis instead being placed upon illustrating the principles of the invention. Moreover, in the figures, like referenced numerals designate corresponding parts throughout the different views.

FIGS. 6a-6d shows tables containing information relating to FIG. 1-4, respectively.

DETAILED DESCRIPTION

The disclosed embodiments relate generally to customizing a geographic location index based on user defined geographic data. The principles described herein may be embodied in many different forms. The disclosed systems and methods may allow search engines, advertisers, or other e-commerce entities to provide a user with relevant information based on the user's search query and other information, including the user's geographic location. The disclosed systems and methods may allow search engines to provide users with relevant advertising and media. Further, the disclosed systems and methods may allow advertisers to define target geographical regions for on-line advertising that are tailored to their own particular business. The disclosed systems and methods may also allow a user, or group of users, to customize a target geographic region to their own unique interests and needs in order to receive on-line content/advertising relevant to that customized region, as well as to be connected to other users within the customized region. For the sake of explanation, the system is described as used in a network environment, but the system may also operate outside of the network environment.

Figure 1:
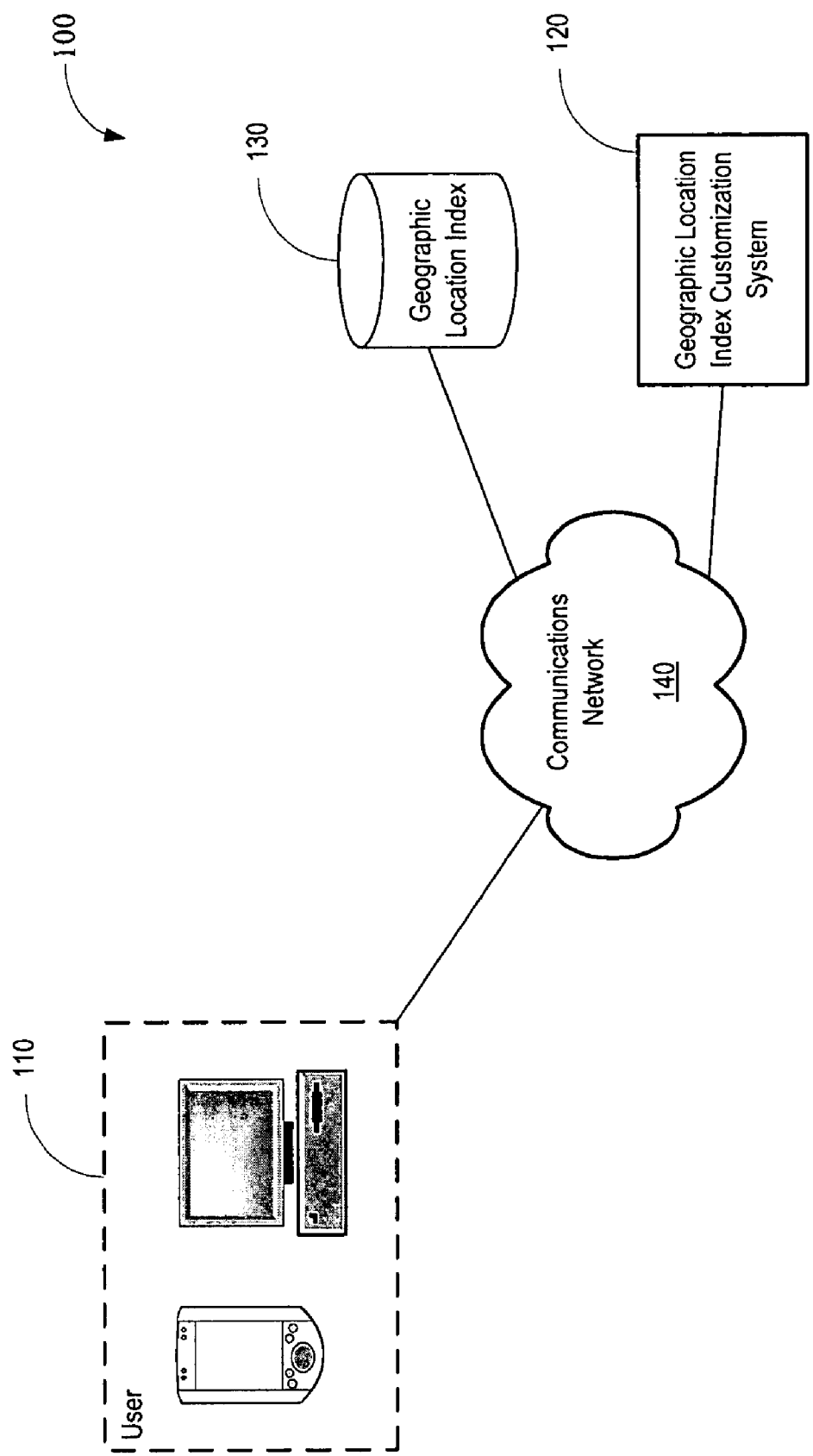
FIG. 1 shows an architecture for customizing a location index for geographically customized on-line content targeting.

FIG. 1 shows an architecture 100 for customizing a location index for geographically customized on-line content targeting. The architecture 100 may include a user client system 110, a geographic location index customization system 120, and a geographic location index 130. The system 120 may allow the user client system 110 to customize or define their targeting regions for distributing or receiving on-line content and update the geographic location index based on the customized target region.

The user client system 110 may correspond to an advertiser that directs certain advertising content to potential customers in specific geographical regions. The system 120 may allow the advertiser to define their own ad targeting regions based on criteria specific to the advertiser's business and/or target audience, such that a publisher may target advertising to users within the corresponding customized geographic region. The user client system 110 may correspond to an individual user that desires to receive on-line content, such as content related to advertising, restaurant listings, entertainment venues, etc., that is relevant to a geographical region defined by the user based in the user's needs/interests. The user client system 110 may be a social network group. For example, the user client system 110 may correspond to a group of user's for which a customized geographic region represents an area of mutual interest. The social network group may be provided with content/advertising relevant to that customized geographic region, and may also be connected to other users within that customized geographic region.

The communications network 140 may be any private or public communications network or combination of networks. The communications network 140 may be configured to couple one computing device, such as a server, system, database, or other network enabled device, to another device to enable communication of data between computing devices. The communications network 140 may generally be enabled to employ any form of machine-readable media for communicating information from one computing device to another. The communications network 140 may include one or more of a wireless network, a wired network, a local area network (LAN), a wide area network (WAN), a direct connection such as through a Universal Serial Bus (USB) port, and the like, and may include the set of interconnected networks that make up the Internet. The communications network 140 may include any communication method by which information may travel between computing devices.

The user client system 110 may connect to the system 120 via the Internet using a standard browser application. The user client system 110 may access a GUI or other interface provided by the system 120. A browser based implementation allows system features to be accessible regardless of the underlying platform of the user client system 110. For example, the user client system 110 may be a desktop, laptop, handheld computer, cell phone, mobile messaging device, network enabled television, digital video recorder, such as TIVO, automobile, or other network enabled user client system 110, which may use a variety of hardware and/or software packages. The user client system 110 may connect to the system 120 using a stand-alone application which may be platform-dependent or platform-independent. Other methods may be used to implement the user client system 110.

The geographic location index customization system 120 may receive user defined geographic data from the user client system 110. Based on the user defined geographic data, the geozone customization system 120 may generate a customized geographic region. The user defined geographic data may include a group of pre-existing geographic regions to be aggregated as a single geographic entity (e.g., as the customized geographic region). The pre-existing geographic regions may be stored in the geographic location index 130. A GUI or other interface provided by the system 120 may include a display, such as a map or list display, of the pre-existing geographic regions from which the user client system 110 may define the customized geographic region.

The system 120 may update the geographic location index 130 with the generated customized geographic region, such that for subsequent index customization operations by the user client system 110, previously generated customized geozone are included among the list of pre-existing geographical regions. FIGS. 6a-6d, which are described in more detail below, show exemplary tables and data that may be stored in the geographic location index. The tables include information identifying the geographic region, relationship data (e.g., an identification of any neighboring, parent, and/or child regions), as well as geographic coordinates related to the geographic region. The geographic location index may include separate, user specific indexes associated with separate users. Updating the geographic location index 130 with the generated customized geographic region may include generating a new identifier associated with the customized geographic region, as well as relationship data associated with the customized geographic region.

Figure 2:
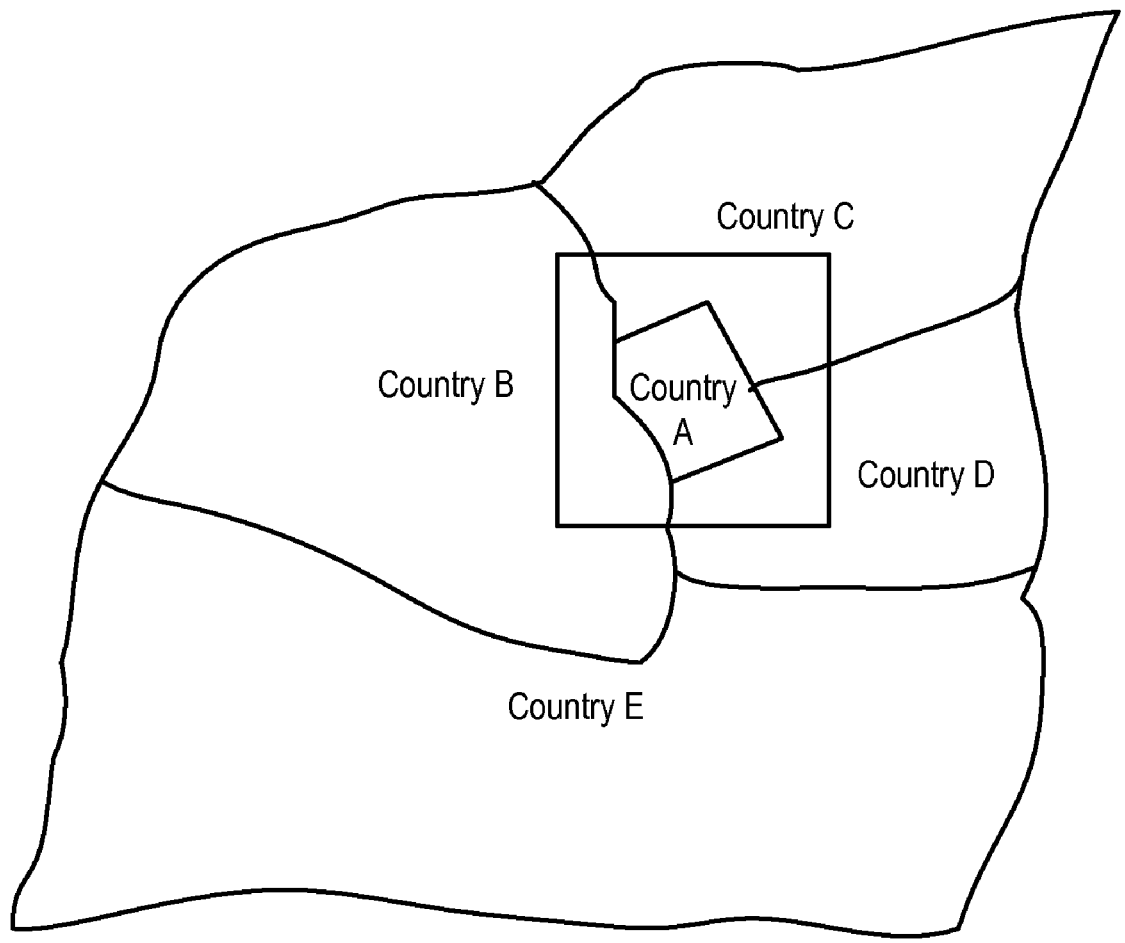
FIG. 2 shows a geographical area divided into a system of discrete non-overlapping geographical zones corresponding to a Country resolution level.

FIG. 2 shows a geographical area divided into a system of discrete non-overlapping geographical zones corresponding to a Country resolution level. Each zone contains a plurality of geographical locations characterized by their geographical co-ordinates. Data relating to each of the geographical locations may be associated with each of the geographical locations.

Each zone may be described as a polygon with an associated name (such as a country name in the case of FIG. 2) or identifier. In FIG. 2, the zones are described by their country names, Country A, Country B, etc. Each zone identifier may be based on a real world name. Generated names, such as a unique number (e.g., an integer value) or character string, may also be associated with each polygon as a zone identifier.

Figure 3:
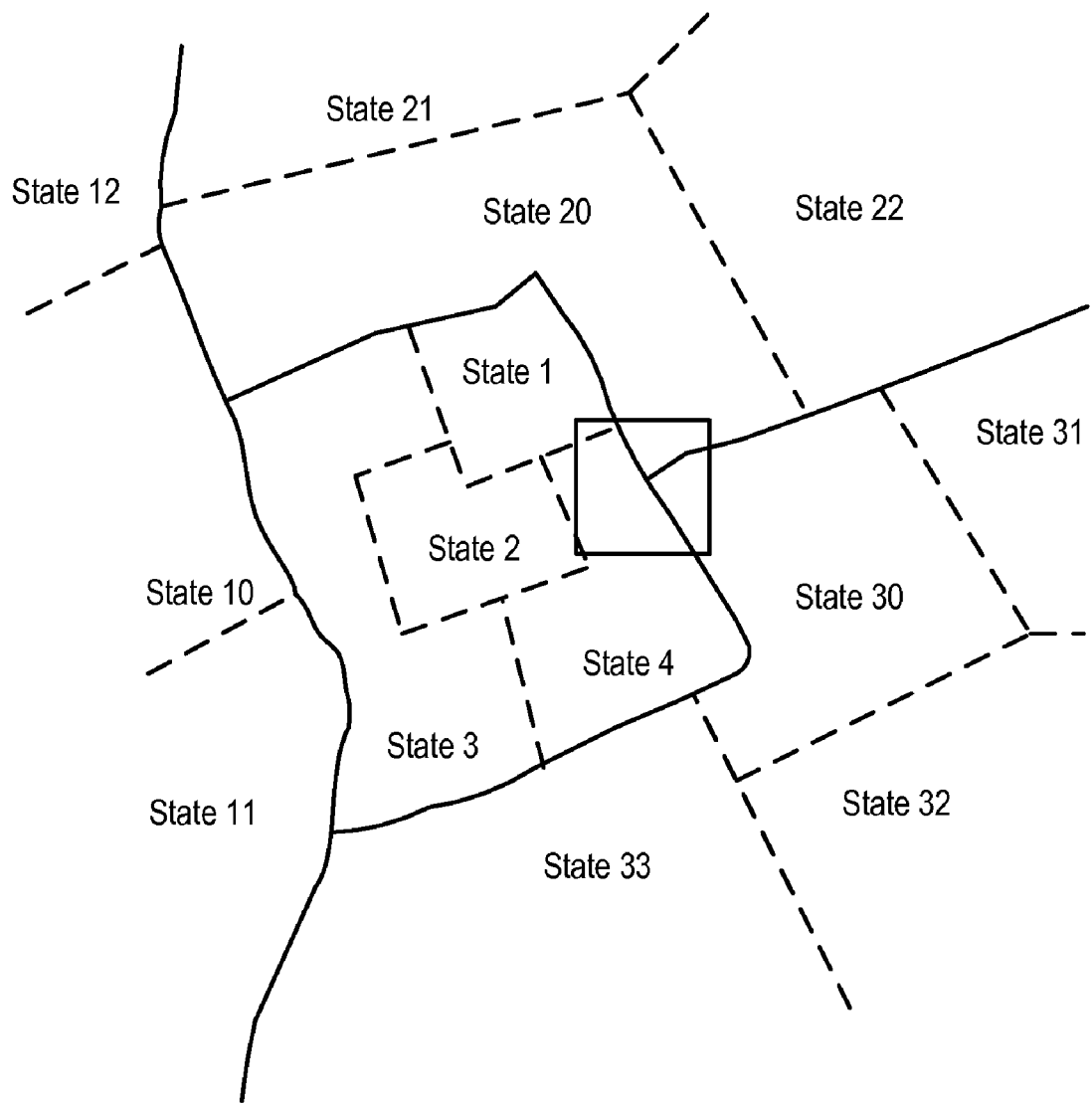
FIG. 3 show layers of a geographical area corresponding to a State resolution level.

A geographic location index may include a finite list of the zones in a geographical area by listing all zones by their identification (e.g. in the case of FIG. 2, there is a finite list of countries). That list is shown in the first column of FIG. 6a. Since the country zones do not overlap, each zone has a finite number of neighboring zones of the same class, i.e. with the same level of resolution. Each level of resolution is considered as a layer. In the present example, the level of resolution is at a country level: a top layer. Below the top layer, the geographical area is divided into a system of discrete non-overlapping geographical zones of higher resolution than the previous top layer (country layer). In this example, the next layer down from the country level is a state level as depicted in FIG. 3. Each of the state zones also contains a plurality of geographical locations characterized by their geographical co-ordinates. Data relating to each of the geographical locations may be associated with each of the geographical locations. The geographical locations are the same geographical locations as in the country level—i.e. if the geographical location is Chicago, then that location is in USA as a country and Illinois as a state—so the same geographical location is in USA and Illinois.

Figure 4:
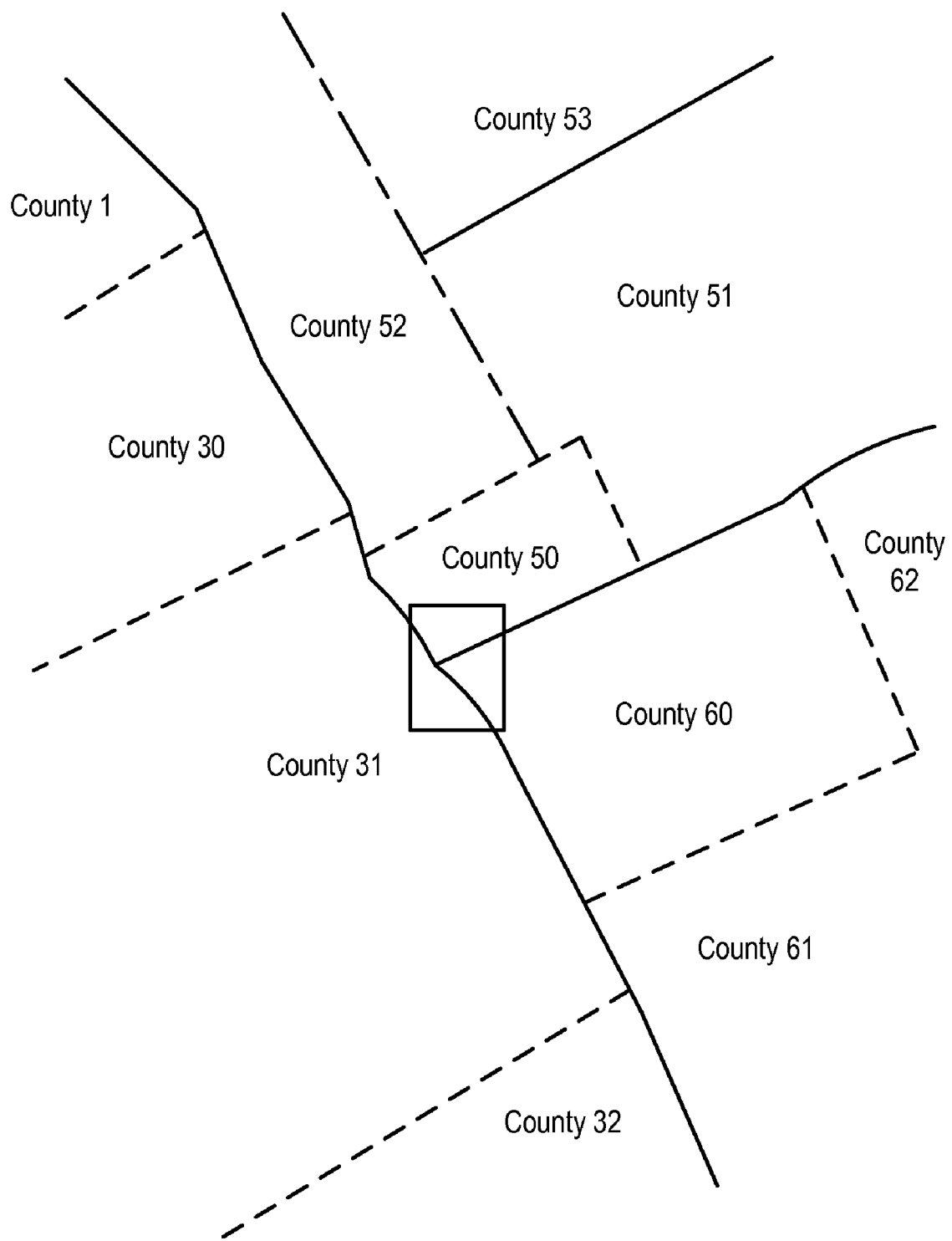
FIG. 4 show layers of a geographical area corresponding to a County resolution level.
Figure 5:
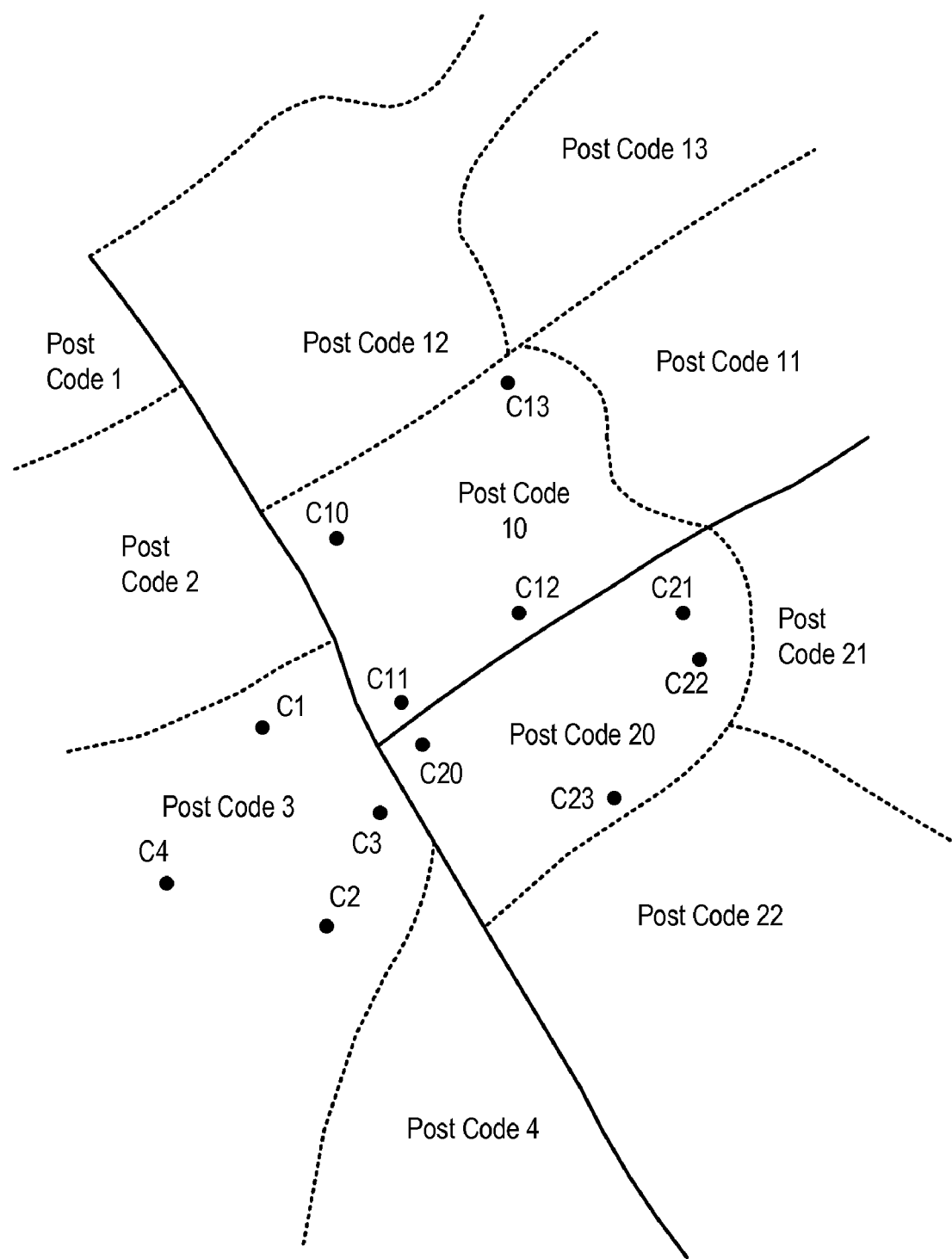
FIG. 5 show layers of a geographical area corresponding to a Post or Zip Code resolution level.

FIGS. 4 and 5 show layers of the geographical area corresponding to a County resolution and a Post or Zip Code resolution level, respectively. Each zone may include a finite number of zones in the layer below. Thus, if the country is the USA, then that country contains all the states of the USA. Each of the zones "contained" in the top layer zones is listed under the respective top layer zone in which they are located. The "contained" zones can be regarded as "child" zones. For the top layer, whilst having "child zones", there are no zones which "contain" the top zone (i.e., there are no "parent" zones). However, lower zones will have "child" zones and one or more "parent" zones. Conversely, the bottom layer will not have any "child" zones but will only have one or more "parent" zones.

Thus, the index for a particular layer comprises a record of the subject zone identifiers in the layer, the zone identifiers of zones neighboring each subject zone, each zone identifier of a "parent" zone, and/or each zone identifier of all "child" zones. The zone identifiers of the zones neighboring each subject zone, of any parent zones, and/or of any child zones may be the relationship data associated with each subject zone.

By combining this information, the index may be compiled to produce a list of all geographical areas, their adjoining neighbors, "parent" areas and contained "child" areas. This information is represented in the combination of the tables for each of the layers in FIGS. 6a-6d and may be embodied in any suitable conventional computer-readable media (such as in the geographic location index referred to in FIG. 1) for utilization by, for example, a search engine, as described below. FIG. 5 illustrates some example co-ordinates within the "postcode" zones. These co-ordinates and the zones which contain them are listed in FIGS. 6a-6d. It will be appreciated that any of the surrounding postcode zones may also include further coordinates, but these are not shown. It will also be appreciated from FIGS. 2-5 and the information recorded in the tables of FIGS. 6a-6d that co-ordinates C1-C4 are contained in area "Post Code 3", as well as in County 3, State 4, and Country A.

Utilizing this system allows a query for data concerning a given geographical point to be analyzed and to return data ordered by its proximity to the given geographical point—in the first instance data would be returned for the subject zone and then data concerning neighboring zones in the same layer.

The process may be repeated for each layer in a geographical system where there are multiple layers of information. Thus, "countries" may be processed separately from "states" which may be processed separately from "counties" which may be processed separately from "postcodes". In embodiments in which each layer of information is processed separately, it is of no importance if the edge polygons in one layer share edges with another level. (Postcodes can typically cross borders of counties in some countries such as in the UK).

Given a point (x, y) or (longitude, latitude) and given a set of named polygons describing the geographical structure, the named geographical identifier to which the point belongs may be determined by checking which polygon it falls within. From this information, an identification of neighboring polygons as well may be determined as well.

In accordance with the structure outlined above, the relevancy of search engine results may be increased relevancy when by allowing improvements in ranking either based on locality names or geographical hierarchical information. The relevancy may be further increased by allowing users to define their own geographic regions in accordance with the architecture described above and shown in FIG. 1.

In one example, a web-page that mentions "Eiffel Tower" but not "Paris" or "France" may still be indexed using the keywords "Paris" and "France" since the hierarchical structure inherent in the data structure outlined above contains this information—France and Paris being the parent zones of "Eiffel Tower".

A search engine may also use this information to improve the internal page ranking for pages which are known to consistently use the hierarchical information. Thus a page which mentions corresponding locations in different layers (example "Eiffel Tower" and "Paris") may be given improved ranking for correct use of both terms. Using the hierarchical information in this manner may assist in countering the practice of "web spamming" where authors of commercial webpages attempt to gain higher search engine ranking by including long lists of location names.

For example, a web-page author will, of course, wish for as many people to visit the web page as possible to, for example, increase the number of potential customers for the products and/or services advertised thereon. There are certain search terms that are used very often in Internet searching, for example: "News" or "MP3". The authors of some web pages—which web pages are not necessarily related to "News" or "MP3"—may wish to improve the likelihood of the web page being returned in a search and will include a list of these common search terms on the web page. Commonly, such web pages will "hide" these terms by using a white colored font on a white background, so that the user is unaware of their existence on the web page.

Content of a body of information, such as a web page or the like, may be reviewed to determine whether the locations named on the page fall consistently into neighboring zones, child zones or parent zones. If the determination indicates consistent inclusion, then the page ranking can be approved or possibly improved. If the determination indicates that the page contains random locations not linked to a coherent set (predetermined by the analysis criteria) of zones, then the page ranking can be lowered.

Indexing and search of data may follow any of the following exemplary methods. In a first exemplary method, any geographical information inserted into the index is recorded against the identifier of each layer of the geographical area it falls within. Any lookup will search data using the identifiers of each layer of the geographical area and their immediate neighbors of the geographical area. (see FIG. 3).

In a second exemplary method, any geographical information inserted into the index is recorded against the identifier of each layer of the geographical area and their immediate neighbors it falls within (see FIG. 3). A lookup may search data using the identifiers of each layer of the geographical area.

Coding all spatial data to an identifier means that the spatial search is now reduced to traditional keyed indexing technology. This may be carried out in accordance with the third exemplary method described below.

In a third exemplary method, the following steps may apply to satisfy a query for specific data in the vicinity of a target geographical location. The method may establish the target zone containing the target geographical location. The method may use the structures outlined above to locate data fulfilling the query within the target zone. The method may use the structures outlined above to locate data fulfilling the query within zones "neighboring" the target zone. The method may also locate data fulfilling the query within zones that are "neighbors of neighbors" of the target zone. The method may use the structures outlined above to find data fulfilling the query within zones containing the target zone—"parent zones".

The method may work outwards and upwards, building up a result set that is grouped by zones that are progressively "less local" to the target geographical location. To aid efficient data retrieval, the index outlined above would be pre-processed to include "maximum efficient search order" information. This would describe the maximum "depth" of neighboring zones to explore before it is more efficient to look for data in a wider "containing zone." To further aid efficient retrieval, the geographic data structures outlined above may be attributed with the identifiers of their "neighbors" on the basis of "travel time", or other measures based on specific variables. In general, the method would enable such variables to be taken into account when "zone neighbors" are identified.

Figure 7:
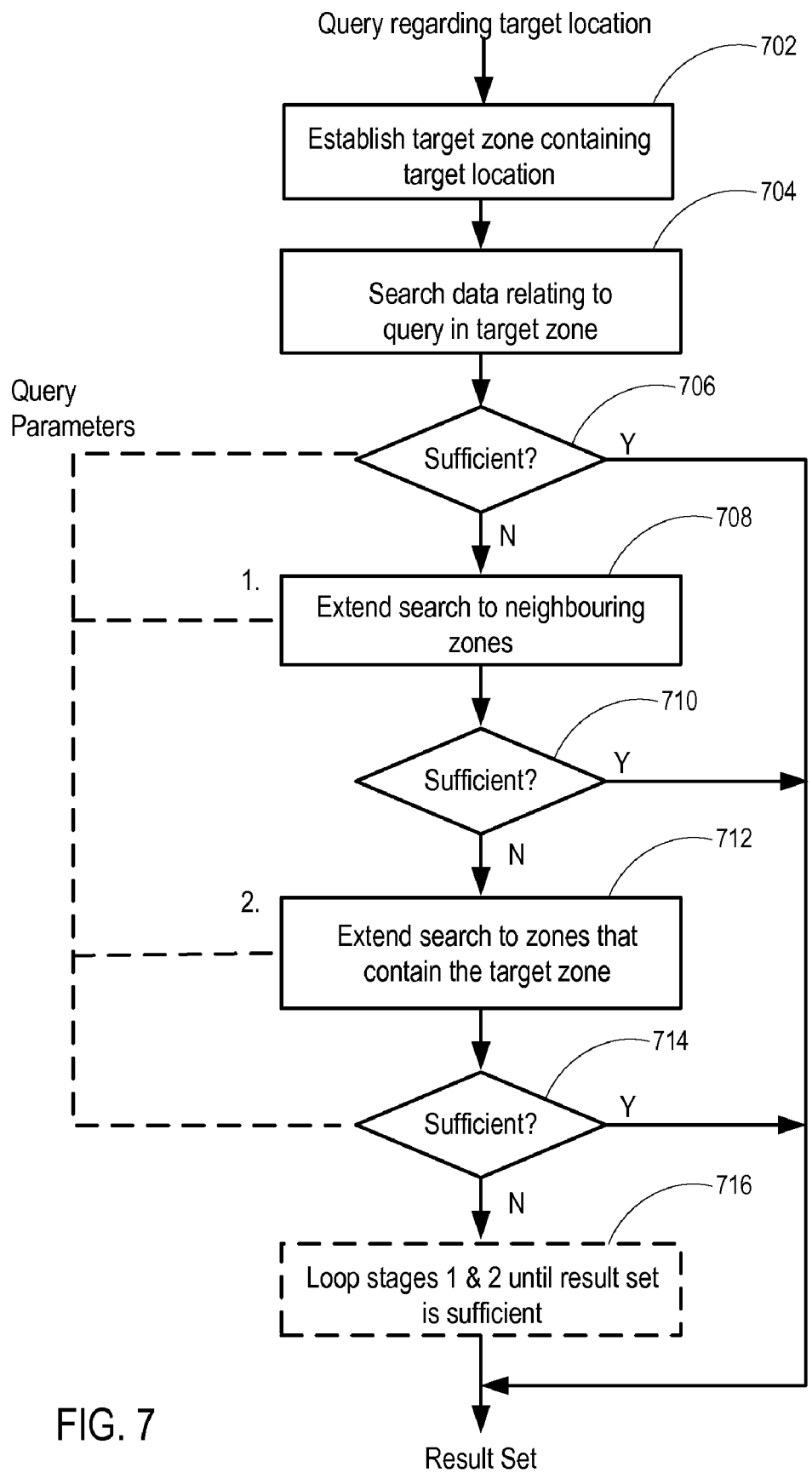
FIG. 7 shows an exemplary process corresponding to geographic location indexing.

FIG. 7 shows a process corresponding to the third exemplary method described above. As can be seen from the flow diagram, a query regarding a target geographical location is entered and the target zone containing said target geographical location is established (Step 702). Data relating to the query in that target zone is then searched (Step 704). Following this step, the amount of data returned is analyzed, based on pre-determined query parameters, to see if the level of information is sufficient. If the data is not sufficient, then the area in which the query is being searched is increased to include zones neighboring the originally indicated target zone (Steps 706, 708, 710, 712, 714, 716).

Still further, to aid efficient data retrieval, the index can store other information in relation to a set of given zones. For example, as well as recording a list of neighbors, parents and children of any given zone, other information, such as the time it takes to travel between zones can be recorded. For example, a user could use an index embodying the present invention to query all of the churches within a two hour drive of a target geographical location (e.g. their home).

Still further, to aid efficient data retrieval, the index can store other information in relation to a set of given zones. For example, as well as recording a list of neighbors, parents and children of any given zone, other information, such as the time it takes to travel between zones can be recorded. For example, a user could use an index embodying the present invention to query all of the churches within a two hour drive of a target geographical location (e.g. their home). The index may be, or be stored in, the geographic location index 120 described with reference to FIG. 1.

Figure 8:
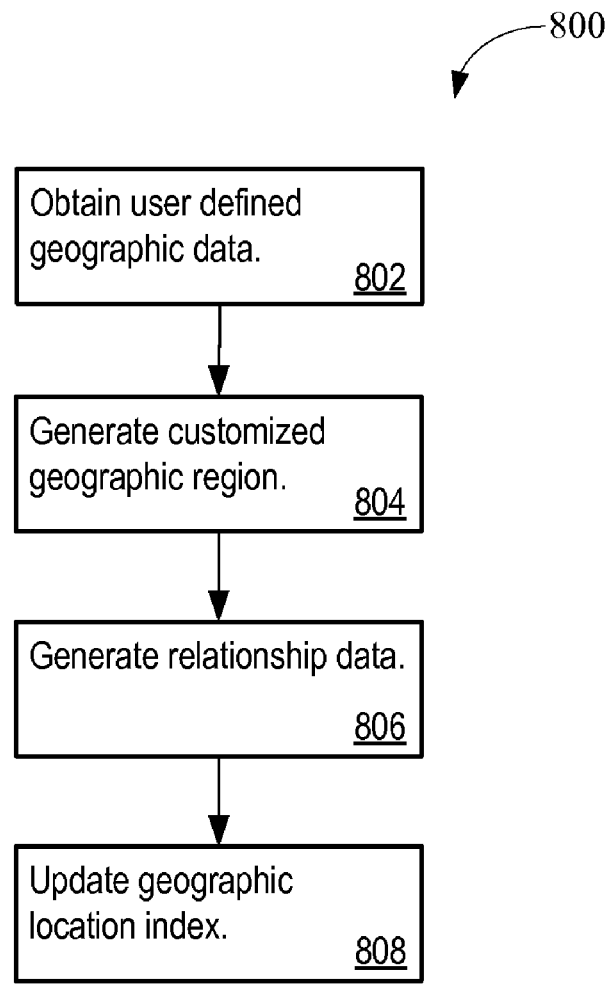
FIG. 8 shows an exemplary process by which a geozone customization system may customize a geographical location index.

FIG. 8 shows an exemplary process 800 by which a geo-zone customization system may customize a geographical location index. The process 800 obtains user defined geographic data (Act 802). The user defined geographic data may include a group of pre-existing geographic regions to be aggregated as a single geographic entity (e.g., as a customized geographic region). The pre-existing geographic regions may be stored in a geographical location index, such as the index 130 discussed above.

The pre-existing geographic regions may be provided to the user through an interface, such as a GUI or other visual interface, or a programmatic interface, to allow the user to define the customized geographic region. The interface may, for example, include a map display that identifies the pre-existing geographical regions. The interface may allow the user to view and/or select between various geographical layers, such as the various layers described above, and/or to view multiple layers in a single display. The interface may allow the user to point, click, type, or otherwise identify the pre-existing geographic regions to be selected into and/or de-selected from geographic regions that the user wishes to be grouped into or removed from a new aggregated region. The user defined geographic data obtained by the process 800 may correspond to the pre-existing geographic regions selected by the user. The geographic location index may include information associated with each pre-existing geographic region, such as, for example, the information in the indexes shown in FIGS. 6a-6d. The geographic location index may also include a minimum bounding rectangle, the total area of the geographic region, or other information associated with each pre-existing geographic region.

Figure 9:
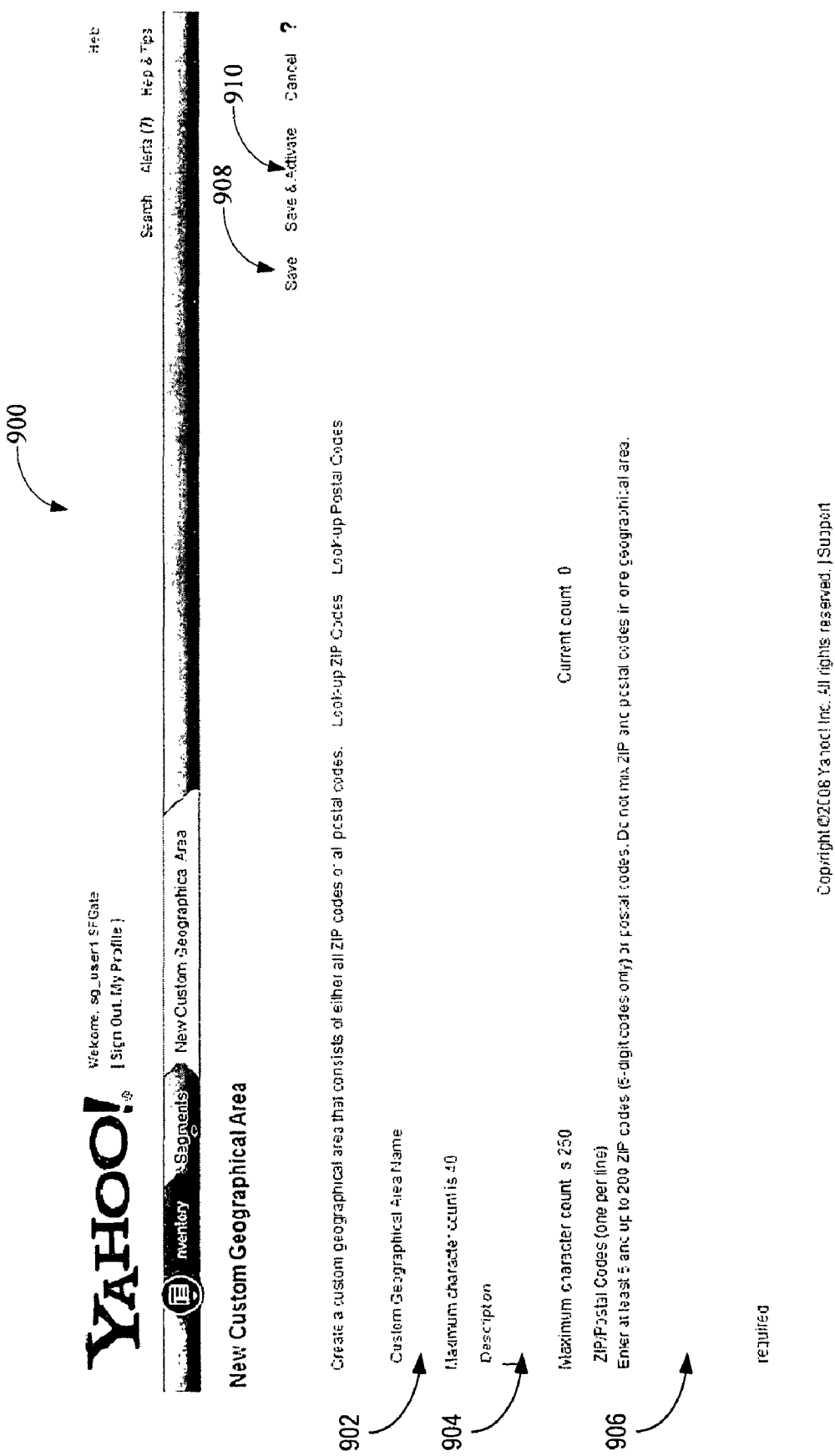
FIG. 9 shows an exemplary interface that may be used to allow the user to input user defined geographic data.

FIG. 9 shows an exemplary interface 900 that may be used to allow the user to input user defined geographic data. In the "Custom Geographical Area Name" field 902, a user may input a custom name for the to-be-customized region. In the "Description" field 904, the user may input a more detailed description of the to-be-customized region. In the "Zip/Postal Codes" field 906, the user may list the ZIP or Postal codes to be aggregated into the new customized region. For example, a user may wish to define a custom geographic region corresponding to ZIP codes 91345, 91609, and 91505 in California's San Fernando valley. In this example, the user may enter "LA SF Valley", or some other name, in field 902; "San Fernando valley" or some other description in field 904; and list the Zip codes 91345, 91609, and 91505 in field 906.

The process 800 may proceed automatically or be triggered to proceed automatically by the user, such as by clicking the "Save" button 908 or "Save and Activate" buttons 910 to proceed. The "Save and Activate" button 910 may allow the user to save the new customized geographic region as well as activate the new customized geographic region for its intended application (e.g., for directing advertising to an audience located within the new customized geographic region and/or to an audience that submits search queries associated with the new customized geographic region). In other embodiments, the new customized geographic region may "activate" automatically. The "Save" button 908 may allow the user to save the new customized geographic region and activate it at another time.

Interface 900 is an example of an interface that may be used in a process 800 that aggregates pre-existing ZIP or Postal Code entities into the customized geographical regions. As noted herein, the process 800 may be used to aggregate pre-existing regions of other resolution levels (e.g., Country, State, County, etc.); corresponding interfaces may be designed accordingly.

Another exemplary interface may provide the user with a map display on which the user can click on and/or drag pre-existing geographic entities on the map display to define the customized geographic region. For example, the interface may allow the user to specify a new customized geographic region by drawing a free-hand polygon onto a map. The geographic location index may include information identifying full geometry of each pre-existing geographic region. The process 800 may determine the coordinates corresponding to the hand-drawn polygon. The determined coordinates may be the user defined geographic data obtained by the process 800.

Based on the obtained user defined geographic data, the process 800 may generate a new customized geographic region (Act 804). As discussed above, the geographic location index includes a polygon identifier associated with each pre-existing geographic region. The polygon identifier may be the proper name of the region, or a generated number (such as an integer value) or character string. When the polygon identifier is an integer value, for example, the process 800 may generate a new unique integer value for the new customized geographic region. The process 800 may also allow the user to provide the new polygon identifier for the new customized geographic region.

As discussed above, the geographic location index includes relationship data associated with each pre-existing geographic region. The process 800 generates relationship data associated with the new user defined customized geographic region (Act 806). The relationship data may include any parent entities, child entities, and/or any neighboring or adjacent entities. The relationship data may also include a "belong-to" list associated with each geographic region. The process 800 may generate the relationship data of the new customized geographic region by examining the relationship data of the constituent entities of the new customized geographic region. The constituent entities of the new customized geographic region may be the pre-existing geographic regions that make up the new customized geographic region. For example, if the user had selected the three zip codes, Zip1, Zip2, and Zip4, in defining a new customized region, then the regions corresponding to those three zip codes would be the constituent entities of the new user defined customized geographic region.

Any common ancestor of the constituent entities of the new aggregate region may be identified as a parent entity of the new aggregate region. In the example above, if county X, state Y, and country Z (not shown) are all common ancestors of Zip1, Zip2, and Zip4, then county A, state B, and country C may be identified as parent entities of the new aggregate zone. Where some, but not all, of the area covered by the constituent entities falls outside a potential parent entity, the process 800 may determine what percentage of the area covered by the constituent entities falls within the potential parent entity and compare that percentage to a parent determination threshold. If the percentage exceeds the threshold, the process 800 may identify that potential parent entity as a parent of the new aggregate region. For example, if 96% of the area covered by the constituent entities is parented by a particular entity (i.e., the potential parent entity), the process 800 may compare that percentage to the parent determination threshold to determine whether the potential parent entity should be identified as a parent entity even though 4% of the area covered by the constituent entities is not parented by the potential parent entity. In this example, if the parent determination threshold is 95%, then the potential parent entity is identified as a parent of the new aggregate zone. The parent determination threshold may be a pre-defined value and may be generated by the process or defined by the user.

The process 800 may identify the child entities of the new customized geographic region as the constituent entities of the new customized geographic region. In the example above, Zip1, Zip2, and Zip4 would be the child entities of the new customized geographic region. In addition, the process may identify any child entities of the constituent entities of the new customized geographic region as a child of the new customized geographic region. Continuing with the above example, any children of Zip1, Zip2, or Zip4 would also be children of the new customized geographic.

The "belong-to" list of the new customized geographic region may be defined as the intersection of the belong-to lists of the constituent entities of the new customized geographic region. For example, assume a new customized geographic region (Aggregate1) consists of two constituent entities (Constituent1 and Constituent2). If Constituent1 belongs to [entity A, entity B, entity C], and Constituent2 belongs to [entity B, entity C, entity D], then Aggregate1 would belong to [entity B, entity C], and would not belong to [entity A, entity D].

The process 800 may also calculate the "belong-to" list of the new customized geographic region based on full geometry of the entities that make up the customized geographic region. For example, a customized geographic region built from postal codes may end up encompassing an entire city, even though the city itself may be larger than any of the individual postal codes. In this instance, this city may belong to the customized geographic region. The full geometry may be stored in the geographic location index and associated with the corresponding geographic entities, or may be accessed from another data source.

The process 800 may identify an "adjacency list" that comprises a list of any entities that neighbor or are adjacent to the new customized geographic region. The adjacency list may be determined based on a union of the adjacency lists of each of the constituent entities of the new customized geographic region minus any regions that share a constituent in common with the new customized geographic region, which may be illustrated with reference to FIG. 9. For example, assume that a user defined region includes a first county and a second county, where the first county borders the state of California and the second county is located within the state of California. The adjacency list of the first county would include California, but California also shares a constituent in common (i.e., the second county) with the user defined region. Thus, the adjacency list of the new customized region would not include California, as California and the user defined region overlap.

Figure 10:
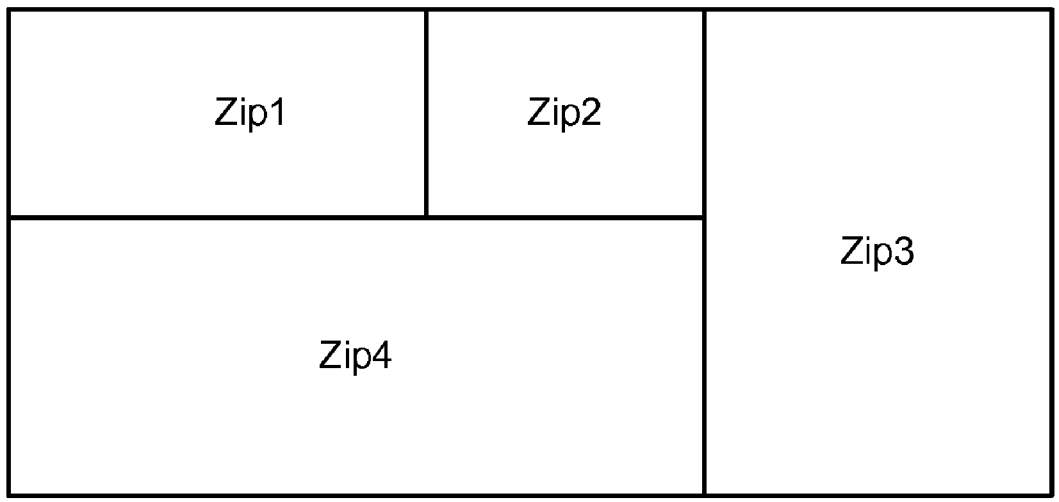
FIG. 10 shows four entities that may be constituents of one or more aggregate regions.

FIG. 10 shows four entities (Zip1, Zip2, Zip3, Zip4) that may be constituents of one or more aggregate regions. For example, Zip1 and Zip2 are constituents of Region1; Zip2 and Zip3 are constituents of Region2; and Zip 3 and Zip4 are constituents of Region3. Region3's adjacency list includes Region1, and visa versa. Region3 and Region2 are not adjacent because they share the constituent entity Zip3.

The process 800 updates the geographic location index based on the generated new customized geographic region and corresponding relationship data (Act 808). The process 800 may add and/or store a new entry to the index corresponding to the new customized geographic region, including a new polygon identifier, as well as any relationship data generated according to Act 806. Once stored in the geographic location index, the new customized geographic region may be numbered among the pre-existing geographic entities from which the user may subsequently select in subsequent geozone customization processes. In other words, in subsequent iterations of the process 800 (such as to generate another customized geographic region based on new user defined geographic data), previously generated and stored customized geographic regions may be selected from by the user in generating newer geographic regions.

The process 800 may also update the relationship data of the pre-existing geographic locations included in the geographic location index. In particular, the process 800 may add the new customized geographic region as a relationship for the pre-existing geographic locations. For example, if the new customized geographic region is a child of RegionA, then the process 800 may update the information associated with RegionA in the geographic location index to include the new customized geographic region among the list of children associated with RegionA.

From the forgoing, it can be seen that the present invention provides improved flexibility and versatility to users that wish to circulate and/or receive information optimized to specific geographic regions. In the context in which the users are advertisers or publishers, the availability of the user defined customized geographic region may provide flexibility in that they may define targeting zones that are optimal to their own unique business environments. In the context in which the users are an individual user or a social network group, the user defined customized geographic region may allow the user or group of users to receive information related to the customized geographic region that is tailored to the user's specific interests and/or needs.

Although selected aspects, features, or components of the implementations are depicted as being stored in memories, all or part of the systems, including the methods and/or instructions for performing such methods consistent with the geozone customization system, may be stored on, distributed across, or read from other machine-readable media, for example, secondary storage devices such as hard disks, floppy disks, and CD-ROMs; a signal received from a network; or other forms of ROM or RAM either currently known or later developed.

Specific components of a geozone customization system may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters (e.g., relationship data), databases, and other data structures may be separately stored and managed, may be incorporated into a single memory or database, or may be logically and physically organized in many different ways. Programs or instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method for customizing a geographic location index, comprising:
  obtaining, using a computer processor, user defined geographic data comprising information identifying a first constituent entity and a second constituent entity, wherein the first and second constituent entities correspond to geographic entities identified in a geographic location index, wherein:
    the geographic location index comprises a first constituent relationship data associated with the first constituent entity and a second constituent relationship data associated with the second constituent entity;
    the first constituent relationship data comprises a first adjacency list comprising an identification of any geographic entity that is adjacent to the first constituent entity; and
    the second constituent relationship data comprises a second adjacency list comprising an identification of any geographic entity that is adjacent to the second constituent entity;
  generating, using the computer processor, a customized geographic region corresponding to a geographic region not identified in the geographic location index based on the user defined geographic data;
  generating, using the computer processor, relationship data corresponding to the customized geographic region based on the first and second constituent relationship data,
    wherein generating the relationship data corresponding to the customized geographic region comprises generating an adjacency list corresponding to the customized geographic region that comprises geographic entities corresponding to a union of the first and second adjacency lists minus any geographic entities in the first or second adjacency lists that share a constituent in common with the customized geographic region;
  updating, using the computer processor, the geographic location index for use in geographically targeted content delivery, where updating the geographic location index is based on the generated customized geographic region and the generated relationship data.

2. The method of claim 1, where generating a customized geographic region comprises generating a unique identifier associated with the customized geographic region.

3. The method of claim 1, where generating the relationship data corresponding to the customized geographic region further comprises:
  identifying from the first and second constituent relationship data whether there is a parent entity in common between the first and second constituent entities; and
  identifying any parent entity in common between the first and second constituent entities as a parent entity of the customized geographic region.

4. The method of claim 1, where generating the relationship data corresponding to the customized geographic region further comprises:
  identifying from the first and second constituent relationship data any child entities of the first and second constituent entities; and
  identifying the first and second constituent entities, as well as the identified child entities of the first and second constituent entities, as child entities of the customized geographic region.

5. A geographic location index customization system, comprising:
  a processor;
  a memory coupled to the processor, the memory comprising:
    a geographic location index;
    instructions that, when executed by the processor, cause the processor to:
      obtain user defined geographic data comprising information identifying a first constituent entity and a second constituent entity, wherein the first and second constituent entities correspond to geographic entities identified in the geographic location index, wherein:
        the geographic location index comprises a first constituent relationship data associated with the first constituent entity and a second constituent relationship data associated with the second constituent entity;
        the first constituent relationship data comprises a first adjacency list comprising an identification of any geographic entity that is adjacent to the first constituent entity; and
        the second constituent relationship data comprises a second adjacency list comprising an identification of any geographic entity that is adjacent to the second constituent entity;
      generate a customized geographic region based on the user defined geographic data corresponding to a geographic region not identified in the geographic location index;
      generate relationship data corresponding to the customized geographic region based on the first and second constituent relationship data,
        wherein generating the relationship data corresponding to the customized geographic region comprises generating an adjacency list corresponding to the customized geographic region that comprises geographic entities corresponding to a union of the first and second adjacency lists minus any geographic entities in the first or second adjacency lists that share a constituent in common with the customized geographic region;

update the geographic location index for use in geographically targeted content delivery, where updating the geographic location index is based on the generated customized geographic region and the generated relationship data; and store the updated geographic location index in the memory.

6. The system of claim 5, where the instructions that, when executed by the processor, cause the processor to generate a customized geographic region further cause the processor to generate a unique identifier associated with the customized geographic region.

7. The system of claim 5, where the instructions that cause the processor to generate the relationship data corresponding to the customized geographic region further comprise instructions that cause the processor to:

identify from the first and second constituent relationship data whether there is a parent entity in common between the first and second constituent entities; and identify any parent entity in common between the first and second constituent entities as a parent entity of the customized geographic region.

8. The system of claim 5, where the instructions that cause the processor to generate the relationship data corresponding to the customized geographic region further comprise instructions that cause the processor to:

identify from the first and second constituent relationship data any child entities of the first and second constituent entities; and identify the first and second constituent entities, as well as the identified child entities of the first and second constituent entities, as child entities of the customized geographic region.

9. A product comprising:

a computer readable medium; and instructions stored on the medium that, when executed, cause a processor in a system for customizing a geographic location index to:

obtain user defined geographic data comprising information identifying a first constituent entity and a second constituent entity, wherein the first and second constituent entities correspond to geographic entities identified in the geographic location index, wherein:

the geographic location index comprises a first constituent relationship data associated with the first constituent entity and a second constituent relationship data associated with the second constituent entity;

the first constituent relationship data comprises a first adjacency list comprising an identification of any geographic entity that is adjacent to the first constituent entity; and the second constituent relationship data comprises a second adjacency list comprising an identification of any geographic entity that is adjacent to the second constituent entity;

generate a customized geographic region based on the user defined geographic data corresponding to a geographic region not identified in the geographic location index;

generate relationship data corresponding to the customized geographic region based on the first and second constituent relationship data, wherein generating the relationship data corresponding to the customized geographic region comprises generating an adjacency list corresponding to the customized geographic region that comprises geographic entities corresponding to a union of the first and second adjacency lists minus any geographic entities in the first or second adjacency lists that share a constituent in common with the customized geographic region; and update the geographic location index for use in geographically targeted content delivery, where updating the geographic location index is based on the generated customized geographic region and the generated relationship data.

10. The product of claim 9, where the instructions that, when executed, cause the processor to generate a customized geographic region further cause the processor to generate a unique identifier associated with the customized geographic region.

11. The product of claim 9, where the instructions that cause the processor to generate the relationship data corresponding to the customized geographic region further comprise instructions that cause the processor to:

identify from the first and second constituent relationship data whether there is a parent entity in common between the first and second constituent entities; and identify any parent entity in common between the first and second constituent entities as a parent entity of the customized geographic region.

12. The product of claim 9, where the instructions that cause the processor to generate the relationship data corresponding to the customized geographic region further comprise instructions that cause the processor to:

identify from the first and second constituent relationship data any child entities of the first and second constituent entities; and identify the first and second constituent entities, as well as the identified child entities of the first and second constituent entities, as child entities of the customized geographic region.

* * * * *

UNITED STATES PATENT AND TRADEMARK OFFICE
CERTIFICATE OF CORRECTION

| | | |
|---|---|---|
| PATENT NO. | : 8,051,087 B2 | Page 1 of 1 |
| APPLICATION NO. | : 12/242148 | |
| DATED | : November 1, 2011 | |
| INVENTOR(S) | : Bruce Andrew Campbell et al. | |

It is certified that error appears in the above-identified patent and that said Letters Patent is hereby corrected as shown below:

On the Title Page: Item (75) Inventors: please delete "Eddie Babcodk" and insert --Eddie Babcock-- therefor.

Signed and Sealed this

Twentieth Day of December, 2011

David J. Kappos
*Director of the United States Patent and Trademark Office*